(12) United States Patent
Kirti et al.

(10) Patent No.: US 7,076,543 B1
(45) Date of Patent: Jul. 11, 2006

(54) METHOD AND APPARATUS FOR COLLECTING, AGGREGATING AND MONITORING NETWORK MANAGEMENT INFORMATION

(75) Inventors: Rituraj Kirti, San Jose, CA (US); John Parello, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 849 days.

(21) Appl. No.: 10/075,960

(22) Filed: Feb. 13, 2002

(51) Int. Cl.
*G06F 15/173* (2006.01)

(52) U.S. Cl. ................................ 709/223; 709/224
(58) Field of Classification Search ............... 709/223, 709/224, 200–205; 370/241–245
See application file for complete search history.

(56) References Cited

U.S. PATENT DOCUMENTS

| | | | |
|---|---|---|---|
| 4,131,767 A | 12/1978 | Weinstein | 179/170.2 |
| 4,161,719 A | 7/1979 | Parikh et al. | 340/147 SY |
| 4,316,284 A | 2/1982 | Howson | 370/105 |
| 4,397,020 A | 8/1983 | Howson | 370/105 |
| 4,419,728 A | 12/1983 | Larson | 364/200 |
| 4,424,565 A | 1/1984 | Larson | 364/200 |
| 4,437,087 A | 3/1984 | Petr | 340/347 DD |
| 4,438,511 A | 3/1984 | Baran | 370/19 |
| 4,439,763 A | 3/1984 | Limb | 340/825.5 |
| 4,445,213 A | 4/1984 | Baugh et al. | 370/94 |
| 4,446,555 A | 5/1984 | Devault et al. | 370/94 |
| 4,456,957 A | 6/1984 | Schieltz | 364/200 |
| 4,464,658 A | 8/1984 | Thelen | 340/825.5 |
| 4,499,576 A | 2/1985 | Fraser | 370/60 |
| 4,506,358 A | 3/1985 | Montgomery | 370/60 |
| 4,507,760 A | 3/1985 | Fraser | 365/221 |
| 4,532,626 A | 7/1985 | Flores et al. | 370/85 |
| 4,644,532 A | 2/1987 | George et al. | 370/94 |
| 4,646,287 A | 2/1987 | Larson et al. | 370/60 |
| 4,677,423 A | 6/1987 | Benvenuto et al. | 340/347 DD |
| 4,679,189 A | 7/1987 | Olson et al. | 370/60 |
| 4,679,227 A | 7/1987 | Hughes-Hartogs | 379/98 |

(Continued)

FOREIGN PATENT DOCUMENTS

EP    0 384 758 A2    8/1990

(Continued)

OTHER PUBLICATIONS

Newton's Telecom DIctionary, 17th Updated and Expanded Edition, by Harry Newton, published by CMP Books, 2001, p. 781.*

(Continued)

*Primary Examiner*—Zarni Maung
*Assistant Examiner*—Van Nguyen
(74) *Attorney, Agent, or Firm*—Hickman Palermo Truong & Becker LLP

(57) ABSTRACT

A method is disclosed for collecting, aggregating and monitoring network management information from a plurality of network devices in a network management system. The method utilizes user-definable configuration information that contains an operational specification on what to collect, aggregate and monitor, which can be scheduled at desired times or intervals. The method begins by identifying network devices on the network, then querying and acquiring data in accordance with instructions contained in the operational specification. The method performs transformations and will periodically monitor the data for compliance with specific threshold conditions. Notifications are generated whenever a threshold condition has been met. Data is stored to a database and aggregated to generate trending information. Data stored in the database can be subsequently removed automatically based on aging or other criteria specified by the user. The method renders data to a display for viewing by the user using device-specific GUI attributes.

21 Claims, 12 Drawing Sheets

U.S. PATENT DOCUMENTS

| | | | |
|---|---|---|---|
| 4,723,267 A | 2/1988 | Jones et al. | 379/93 |
| 4,731,816 A | 3/1988 | Hughes-Hartogs | 379/98 |
| 4,750,136 A | 6/1988 | Arpin et al. | 364/514 |
| 4,757,495 A | 7/1988 | Decker et al. | 370/76 |
| 4,763,191 A | 8/1988 | Gordon et al. | 358/86 |
| 4,769,810 A | 9/1988 | Eckberg, Jr. et al. | 370/60 |
| 4,769,811 A | 9/1988 | Eckberg, Jr. et al. | 370/60 |
| 4,771,425 A | 9/1988 | Baran et al. | 370/85 |
| 4,819,228 A | 4/1989 | Baran et al. | 370/85 |
| 4,827,411 A | 5/1989 | Arrowood et al. | 364/300 |
| 4,833,706 A | 5/1989 | Hughes-Hartogs | 379/98 |
| 4,835,737 A | 5/1989 | Herrig et al. | 364/900 |
| 4,879,551 A | 11/1989 | Georgiou et al. | 340/825.87 |
| 4,893,306 A | 1/1990 | Chao et al. | 340/94.2 |
| 4,903,261 A | 2/1990 | Baran et al. | 370/94.2 |
| 4,922,486 A | 5/1990 | Lidinsky et al. | 370/60 |
| 4,933,937 A | 6/1990 | Konishi | 370/85.13 |
| 4,960,310 A | 10/1990 | Cushing | 350/1.7 |
| 4,962,497 A | 10/1990 | Ferenc et al. | 370/60.1 |
| 4,962,532 A | 10/1990 | Kasiraj et al. | 380/25 |
| 4,965,772 A | 10/1990 | Daniel et al. | 364/900 |
| 4,970,678 A | 11/1990 | Sladowski et al. | 364/900 |
| 4,980,897 A | 12/1990 | Decker et al. | 375/38 |
| 4,991,169 A | 2/1991 | Davis et al. | 370/77 |
| 5,003,595 A | 3/1991 | Collins et al. | 380/25 |
| 5,014,265 A | 5/1991 | Hahne et al. | 370/60 |
| 5,020,058 A | 5/1991 | Holden et al. | 370/109 |
| 5,033,076 A | 7/1991 | Jones et al. | 379/67 |
| 5,054,034 A | 10/1991 | Hughes-Hartogs | 375/8 |
| 5,059,925 A | 10/1991 | Weisbloom | 331/1 A |
| 5,072,449 A | 12/1991 | Enns et al. | 371/37.1 |
| 5,088,032 A | 2/1992 | Bosack | 395/200 |
| 5,095,480 A | 3/1992 | Fenner | 370/94.1 |
| RE33,900 E | 4/1992 | Howson | 370/105 |
| 5,115,431 A | 5/1992 | Williams et al. | 370/94.1 |
| 5,128,945 A | 7/1992 | Enns et al. | 371/37.1 |
| 5,136,580 A | 8/1992 | Videlock et al. | 370/60 |
| 5,199,049 A | 3/1993 | Wilson | 375/104 |
| 5,206,886 A | 4/1993 | Bingham | 375/97 |
| 5,208,811 A | 5/1993 | Kashio et al. | 370/94.1 |
| 5,212,686 A | 5/1993 | Joy et al. | 370/60 |
| 5,224,099 A | 6/1993 | Corbalis et al. | 370/94.2 |
| 5,226,120 A | 7/1993 | Brown et al. | 395/200 |
| 5,228,062 A | 7/1993 | Bingham | 375/97 |
| 5,229,994 A | 7/1993 | Balzano et al. | 370/85.13 |
| 5,237,564 A | 8/1993 | Lespagnol et al. | 370/60.1 |
| 5,241,682 A | 8/1993 | Bryant et al. | 395/800 |
| 5,243,342 A | 9/1993 | Kattemalalavadi et al. | 341/106 |
| 5,243,596 A | 9/1993 | Port et al. | 370/94.1 |
| 5,247,516 A | 9/1993 | Bernstein et al. | 370/82 |
| 5,249,178 A | 9/1993 | Kurano et al. | 370/60 |
| 5,249,292 A | 9/1993 | Chiappa | 395/650 |
| 5,255,291 A | 10/1993 | Holden et al. | 375/111 |
| 5,260,933 A | 11/1993 | Rouse | 370/14 |
| 5,260,978 A | 11/1993 | Fleischer et al. | 375/106 |
| 5,268,592 A | 12/1993 | Bellamy et al. | 307/43 |
| 5,274,631 A | 12/1993 | Bhardwaj | 370/60 |
| 5,274,635 A | 12/1993 | Rahman et al. | 370/60.1 |
| 5,274,643 A | 12/1993 | Fisk | 370/94.1 |
| 5,280,470 A | 1/1994 | Buhrke et al. | 370/13 |
| 5,280,480 A | 1/1994 | Pitt et al. | 370/85.13 |
| 5,280,500 A | 1/1994 | Mazzola et al. | 375/17 |
| 5,283,783 A | 2/1994 | Nguyen et al. | 370/16.1 |
| 5,287,103 A | 2/1994 | Kasprzyk et al. | 340/825.52 |
| 5,287,453 A | 2/1994 | Roberts | 395/200 |
| 5,291,482 A | 3/1994 | McHarg et al. | 370/60 |
| 5,305,311 A | 4/1994 | Lyles | 370/60 |
| 5,307,343 A | 4/1994 | Bostica et al. | 370/60 |
| 5,311,509 A | 5/1994 | Heddes et al. | 370/60 |
| 5,313,454 A | 5/1994 | Bustini et al. | 370/13 |
| 5,313,582 A | 5/1994 | Hendel et al. | 395/250 |
| 5,317,562 A | 5/1994 | Nardin et al. | 370/16 |
| 5,319,644 A | 6/1994 | Liang | 370/85.5 |
| 5,327,421 A | 7/1994 | Hiller et al. | 370/60.1 |
| 5,331,637 A | 7/1994 | Francis et al. | 370/54 |
| 5,345,445 A | 9/1994 | Hiller et al. | 370/60.1 |
| 5,345,446 A | 9/1994 | Hiller et al. | 370/60.1 |
| 5,359,592 A | 10/1994 | Corbalis et al. | 370/17 |
| 5,361,250 A | 11/1994 | Nguyen et al. | 370/16.1 |
| 5,361,256 A | 11/1994 | Doeringer et al. | 370/60 |
| 5,361,259 A | 11/1994 | Hunt et al. | 370/84 |
| 5,365,524 A | 11/1994 | Hiller et al. | 370/94.2 |
| 5,367,517 A | 11/1994 | Cidon et al. | 370/54 |
| 5,371,852 A | 12/1994 | Attanasio et al. | 395/200 |
| 5,386,567 A | 1/1995 | Lien et al. | 395/700 |
| 5,390,170 A | 2/1995 | Sawant et al. | 370/58.1 |
| 5,390,175 A | 2/1995 | Hiller et al. | 370/60 |
| 5,394,394 A | 2/1995 | Crowther et al. | 370/60 |
| 5,394,402 A | 2/1995 | Ross | 370/94.1 |
| 5,400,325 A | 3/1995 | Chatwani et al. | 370/60.1 |
| 5,408,469 A | 4/1995 | Opher et al. | 370/60.1 |
| 5,416,842 A | 5/1995 | Aziz | 380/30 |
| 5,422,880 A | 6/1995 | Heitkamp et al. | 370/60 |
| 5,422,882 A | 6/1995 | Hiller et al. | 370/60.1 |
| 5,423,002 A | 6/1995 | Hart | 395/200 |
| 5,426,636 A | 6/1995 | Hiller et al. | 370/60.1 |
| 5,428,607 A | 6/1995 | Hiller et al. | 370/60.1 |
| 5,430,715 A | 7/1995 | Corbalis et al. | 370/54 |
| 5,430,729 A | 7/1995 | Rahnema | 370/41 |
| 5,442,457 A | 8/1995 | Najafi | 385/400 |
| 5,442,630 A | 8/1995 | Gagliardi et al. | 370/85.13 |
| 5,452,297 A | 9/1995 | Hiller et al. | 370/60.1 |
| 5,473,599 A | 12/1995 | Li et al. | 370/16 |
| 5,473,607 A | 12/1995 | Hausman et al. | 370/85.13 |
| 5,477,541 A | 12/1995 | White et al. | 370/94.1 |
| 5,485,455 A | 1/1996 | Dobbins et al. | 370/60 |
| 5,490,140 A | 2/1996 | Abensour et al. | 370/60.1 |
| 5,490,258 A | 2/1996 | Fenner | 395/401 |
| 5,491,687 A | 2/1996 | Christensen et al. | 370/17 |
| 5,491,804 A | 2/1996 | Heath et al. | 395/275 |
| 5,509,006 A | 4/1996 | Wilford et al. | 370/60 |
| 5,519,704 A | 5/1996 | Farinacci et al. | 370/85.13 |
| 5,526,489 A | 6/1996 | Nilakantan et al. | 395/200.02 |
| 5,530,963 A | 6/1996 | Moore et al. | 395/200.15 |
| 5,535,195 A | 7/1996 | Lee | 370/54 |
| 5,539,734 A | 7/1996 | Burwell et al. | 370/60 |
| 5,541,911 A | 7/1996 | Nilakantan et al. | 370/13 |
| 5,546,370 A | 8/1996 | Ishikawa | 369/77.2 |
| 5,555,244 A | 9/1996 | Gupta et al. | 370/60.1 |
| 5,561,669 A | 10/1996 | Lenney et al. | 370/60.1 |
| 5,583,862 A | 12/1996 | Callon | 370/397 |
| 5,592,470 A | 1/1997 | Rudrapatna et al. | 370/320 |
| 5,598,581 A | 1/1997 | Daines et al. | 395/872 |
| 5,600,798 A | 2/1997 | Cherukuri et al. | 395/200.13 |
| 5,604,868 A | 2/1997 | Komine et al. | 395/200.15 |
| 5,617,417 A | 4/1997 | Sathe et al. | 370/394 |
| 5,617,421 A | 4/1997 | Chin et al. | 370/402 |
| 5,621,720 A | 4/1997 | Bronte et al. | 370/13 |
| 5,630,125 A | 5/1997 | Zellweger | 395/614 |
| 5,631,908 A | 5/1997 | Saxe | 370/235 |
| 5,632,021 A | 5/1997 | Jennings et al. | 395/309 |
| 5,634,010 A | 5/1997 | Ciscon et al. | 395/200 |
| 5,644,718 A | 7/1997 | Belove et al. | 395/200 |
| 5,666,353 A | 9/1997 | Klausmeier et al. | 370/230 |
| 5,673,265 A | 9/1997 | Gupta et al. | 370/432 |
| 5,678,006 A | 10/1997 | Valizadeh et al. | 395/200.02 |
| 5,680,116 A | 10/1997 | Hashimoto et al. | 340/827 |
| 5,684,797 A | 11/1997 | Aznar et al. | 370/390 |
| 5,687,324 A | 11/1997 | Green et al. | 395/250 |
| 5,689,506 A | 11/1997 | Chiussi et al. | 370/388 |
| 5,691,984 A | 11/1997 | Gardner et al. | 370/401 |
| 5,724,351 A | 3/1998 | Chao et al. | 370/395 |
| 5,742,760 A | 4/1998 | Picazo, Jr. et al. | 395/200.02 |
| 5,748,186 A | 5/1998 | Raman | 345/302 |

| | | | |
|---|---|---|---|
| 5,754,547 | A | 5/1998 | Nakazawa .................. 370/401 |
| 5,802,054 | A | 9/1998 | Bellenger et al. ........... 370/401 |
| 5,835,710 | A | 11/1998 | Nagami et al. .......... 395/200.8 |
| 5,854,903 | A | 12/1998 | Morrison et al. ...... 395/200.79 |
| 5,856,981 | A | 1/1999 | Voelker ..................... 371/20.1 |
| 5,898,686 | A | 4/1999 | Virgile ....................... 370/381 |
| 5,903,559 | A | 5/1999 | Acharya et al. ............ 370/355 |
| 6,091,725 | A | 7/2000 | Cheriton et al. ............ 370/392 |
| 6,308,148 | B1 | 10/2001 | Bruins et al. ................. 703/27 |
| 6,418,415 | B1 * | 7/2002 | Walker et al. ................ 705/26 |
| 6,546,420 | B1 * | 4/2003 | Lemler et al. .............. 709/224 |
| 6,751,663 | B1 * | 6/2004 | Farrell et al. ............... 709/224 |
| 6,769,112 | B1 * | 7/2004 | Montana et al. ............ 717/101 |
| 6,836,786 | B1 * | 12/2004 | Zoller et al. ................ 709/203 |
| 2001/0041973 | A1 * | 11/2001 | Abkowitz et al. ............ 703/23 |
| 2002/0085020 | A1 * | 7/2002 | Carroll, Jr. .................. 345/700 |
| 2003/0212610 | A1 * | 11/2003 | Duffy et al. ................. 705/26 |
| 2004/0068481 | A1 * | 4/2004 | Seshadri et al. ............... 707/1 |

FOREIGN PATENT DOCUMENTS

| | | |
|---|---|---|
| EP | 0 384 758 A3 | 8/1990 |
| EP | 0 431 751 A1 | 11/1990 |
| WO | WO 095/20850 | 8/1995 |

OTHER PUBLICATIONS

Stallings, William, "Data and Computer Communications", pp. 329-333, Prentice Hall, Upper Saddle River, New Jersey.

Chowdhury, et al., "Alternative Bandwidth Allocation Algorithms for Packet Video in ATM Networks", 1992, IEEE Infocom 92, pp. 1061-1068.

Newman, et al., "Flow Labelled IP: A Connectionless Approach to ATM," IEEE, 1996, pp. 1251-1260.

Girish, et al., "Trading Packet Headers for Packet Processing", IEEE, 1996, pp. 141-152.

Esaki, et al., "Datagram Delivery in an ATM-Internet," IEICE Transactions on Communications vol. E77-B, No. 3, (Mar. 1994), Tokyo, Japan.

Zhang, et al., "Rate-Controlled Static-Priority Queueing", 1993, IEEE, pp. 227-236.

Doeringer, et al., "Routing on Longest-Matching Prefixes", IEEE ACM Transactions on Networking, Feb. 1, 1996, vol. 4, No. 1, pp. 86-97.

IBM Corp., "Method and Apparatus for the Statistical Multiplexing of Voice, Data, and Image Signals", Nov. 1992, IBM Technical Disclosure Bulletin, vol. 35, No. 6, pp. 409-411.

* cited by examiner

XML CONFIGURATION PAGE

```
NAME
SECTION
310

SCHEDULER
SECTION
320

TARGET
SECTION
330

OPERATION
SECTION
340

STORAGE
SECTION
350

THRESHOLD
SECTION
360

AGGREGATION
SECTION
370

TABLE TRIMMER
SECTION
380

PRESENTATION
SECTION
390
```
↳ 210

FIG. 3A

```
<!ELEMENT Collector (Schedule, InputBlock) >
<!ELEMENT Schedule (Poll?) >
<!ELEMENT Poll (EMPTY) >
<!ELEMENT InputBlock (QueryBlock) >
<!ELEMENT QueryBlock (Query, ForEachRow) >
<!ELEMENT Query (ModelQuery | SnmpQuerySet) >
<!ELEMENT ModelQuery (#PCDATA) >
<!ELEMENT SnmpQuerySet (SnmpQuery+) >
<!ELEMENT SnmpQuery (SnmpVariable+) >
<!ELEMENT SnmpVariable (EMPTY) >
<!ELEMENT ForEachRow (QueryBlock | OutputBlock) >
<!ELEMENT OutputBlock (Column*, Threshold*) >
<!ELEMENT Column (Formula) >
<!ELEMENT Formula (SimpleFormula | ArithmeticFormula) >
<!ELEMENT SimpleFormula (EMPTY) >
<!ELEMENT ArithmeticFormula (#PCDATA) >
<!ELEMENT Threshold (ArithmeticFormula, Notification) >
<!ELEMENT Notification (#PCDATA) >
<!ATTLIST Collector name CDATA #REQUIRED >
<!ATTLIST Collector version CDATA #REQUIRED >
<!ATTLIST Poll frequency CDATA #REQUIRED >
<!ATTLIST SnmpQuery ipVariable CDATA #REQUIRED >
<!ATTLIST SnmpQuery operation (GET|GETTABLE) #REQUIRED >
<!ATTLIST SnmpQuery instance CDATA #REQUIRED >
<!ATTLIST SnmpVariable name CDATA #REQUIRED >
<!ATTLIST SnmpVariable oid CDATA #REQUIRED >
<!ATTLIST SnmpVariable type
 (OID|INT32|UINT32|TIMETICKS|COUNTER32|COUNTER64|GAUGE32|IPADDR
ESS|OCTETSTRING) #REQUIRED >
<!ATTLIST Column name CDATA #REQUIRED >
<!ATTLIST Column description CDATA #IMPLIED >
<!ATTLIST Column type (BOOL | INT8 | INT32 | INT64 | STRING |
FLOAT | DOUBLE ) #REQUIRED >
<!ATTLIST Column size CDATA #IMPLIED >
<!ATTLIST Column isKey (YES|NO) "NO" >
<!ATTLIST SimpleFormula variableName CDATA #REQUIRED >
```

FIG 3B

```
<?xml version="1.0" encoding="UTF-8" standalone="no" ?>
<!DOCTYPE Collector SYSTEM "CscoRsaCollectorConfig.dtd" >
311─<Collector name="Router Host Information" version="1.0">
      <Schedule>
321{      <Poll frequency="60000" />
      </Schedule>
      <InputBlock>
         <QueryBlock>
            <Query>
               <ModelQuery>select Name, SysName, ProductType,
331{ ManagementIPAddress from Cisco_ManagedNetworkElement where
     ProductFamily="Router"</ModelQuery>
            </Query>
            <ForEachRow>
               <QueryBlock>
                  <Query>
                     <SnmpQuerySet>
332{                    <SnmpQuery ipVariable="ManagementIPAddress"
     operation="GET" instance="0" >
                           <SnmpVariable name="SysUpTime"
     oid="sysUpTime" type="TIMETICKS" />
                           <SnmpVariable name="CPU1Minute"
341{ oid="avgBusy1" type="INT32" />
                           <SnmpVariable name="CPU5Minute"
     oid="avgBusy5" type="INT32" />
                        </SnmpQuery>
                     </SnmpQuerySet>
                  </Query>
               <ForEachRow>
                  <OutputBlock>
                     <Column name="DeviceDbId" type="INT32" isKey="YES"
     >
                        <Formula>
                           <SimpleFormula name="Name" />
351{                    </Formula>
                     </Column>
                     <Column name="HostName" type="STRING" size="1024">
                        <Formula>
                           <SimpleFormula name="SysName" />
                        </Formula>
                     </Column>
                     <Column name="IPAddress" type="STRING" size="15" >
                        <Formula>
```

FIG 3C

```
                              <SimpleFormula name="ManagementIPAddress" />
                            </Formula>
                          </Column>
                          <Column name="ProductType" type="STRING" size="256"
            >
                            <Formula>
                              <SimpleFormula name="ProductType" />
                            </Formula>
                          </Column>
                          <Column name="SysUpTime" type="INT64" >
                            <Formula>
351                            <SimpleFormula name="SysUpTime" />
                            </Formula>
                          </Column>
                          <Column name="CPU1Minute" type="INT32" >
                            <Formula>
                              <SimpleFormula name="CPU1Minute" />
                            </Formula>
                          </Column>
                          <Column name="CPU5Minute" type="INT32" >
                            <Formula>
                              <SimpleFormula name="CPU5Minute" />
                            </Formula>
                          </Column>
                          <Threshold>
361                            <ArithmeticFormula>CPU5Minute >= 90
      & CPU5Minute.Previous < 90</ArithmeticFormula>
362                            <Notification>Router $HostName$ CPU
      utilization exceeded 90%</Notification>
                          </Threshold>
                        </OutputBlock>
                      </ForEachRow>
                    </QueryBlock>
                  </ForEachRow>
                </QueryBlock>
              </InputBlock>
            </Collector>
```

FIG 3C
(continued)

METHOD AND APPARATUS FOR COLLECTING, AGGREGATING AND MONITORING NETWORK MANAGEMENT INFORMATION

FIELD OF THE INVENTION

The present invention generally relates to data processing. The invention relates more specifically to computer systems or software systems that collect, aggregate and monitor network management information.

BACKGROUND OF THE INVENTION

A computer network generally includes a number of network devices, such as switches, routers, and others, connected so as to allow communication among the devices and end station devices such as desktop machines, servers, hosts, printers, fax machines, and others. Each network device has a processor and a memory. Status variables and other values in the memory are continuously changed and updated as the device operates.

Computer networks have become ubiquitous in the home, office and industrial environment. As computer networks have grown ever more complex, automated mechanisms for organizing and managing the networks have emerged. These mechanisms are generally implemented in the form of one or more computer programs, and are generically known as network management systems or applications. Network management refers to the function of requesting and monitoring information on a network device relating to fault, configuration, status, performance and security. To monitor the status of a device in the network, a network management station or system transmits a message requesting information over the network to a software program or agent running on the target network device. In response, the agent sends a message over the network to the network management station. The communications are carried out according to an agreed-upon protocol, such as the Simple Network Management Protocol (SNMP).

However, the hardware and software that perform network management functions must often deal with many different network devices that communicate using device-specific protocols. Thus, the scalability of a network management system can be limited when new devices are added to the network with protocols that are not supported by the system. Also, network management systems can only return information about the current status of a device at the time the information is requested, in essence forming a "snapshot" of the status of the device. Finally, current network management systems lack the capability to analyze and monitor the information that is collected from network devices.

One past approach is to use network management data models and information bases in an attempt to normalize the desired information. Examples of such models include the Cisco Information Model, as implemented in the Asynchronous Network Interface element of certain network management systems from Cisco Systems, Inc. as well as other proprietary systems. These systems are capable of identifying devices in a network and gathering data from a device.

However, these approaches have numerous disadvantages. First, they are difficult to scale when changes occur, usually requiring a software upgrade, and cannot model all the information desired to do network management. Occasionally, committee reviews are required to approve the changes. Second, a network device may require separate network management software in order to accommodate the many different network communication protocols used to extract information from the device when it is not present in the network management models or databases. Third, models can only show the state of the network device at the moment the status is requested, and cannot generate information as to the performance of a device over time. This "snapshot" information is less meaningful to a user than is data that shows a trend between two or more data points in time. Finally, these models cannot generate a notification to a user when data falls outside a desired value or range of values.

Based on the foregoing, there is a clear need for a method of network management that can specify what device data to collect, where to collect it, when to collect it and how to analyze it after collection, without the need to upgrade the network management software. Also, there is a need for a method that is scalable with various network devices using different network communication protocols and can monitor network device activity.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for collecting, aggregating and monitoring network management information in a network management system. The method utilizes user-definable configuration information comprising an operational specification on what to collect, aggregate and monitor. The method can change the operational specification without software upgrades. Included in the operational specification are scheduling instructions for carrying out one or more of these tasks at preset times or intervals.

The method begins by identifying network devices on the network. The network devices are then queried and data is acquired in accordance with the instructions contained in the operational specification of the configuration information. The method can perform transformations to the acquired data according to formulas specified in the operational specification. The method periodically monitors the data for compliance with specific threshold conditions, which are also a part of the operational specification. It can then generate a notification to a user whenever a threshold condition has been met. The acquired or transformed data can be stored to a database for subsequent retrieval. The operational specification contains instructions on how to aggregate the stored data in order to generate trending information. Data stored in the database can be subsequently removed automatically based on aging criteria or other criteria specified by the user. The method can render data to a display for viewing by the user using device-specific GUI attributes.

In other aspects, the invention encompasses an apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram that illustrates the structure of an XML configuration file;

FIGS. 3B and 3C depict examples of an XML DTD and XML file, respectively;

DETAILED DESCRIPTION OF THE PREFERRED EMBODIMENT

A method and apparatus for collecting, aggregating and monitoring network management information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OPERATIONAL CONTEXT 2.0 STRUCTURAL OVERVIEW 3.0 FUNCTIONAL OVERVIEW 4.0 IMPLEMENTATION MECHANISMS—HARDWARE OVERVIEW 5.0 EXTENSIONS AND ALTERNATIVES

1.0 Operational Context

Figure 1:
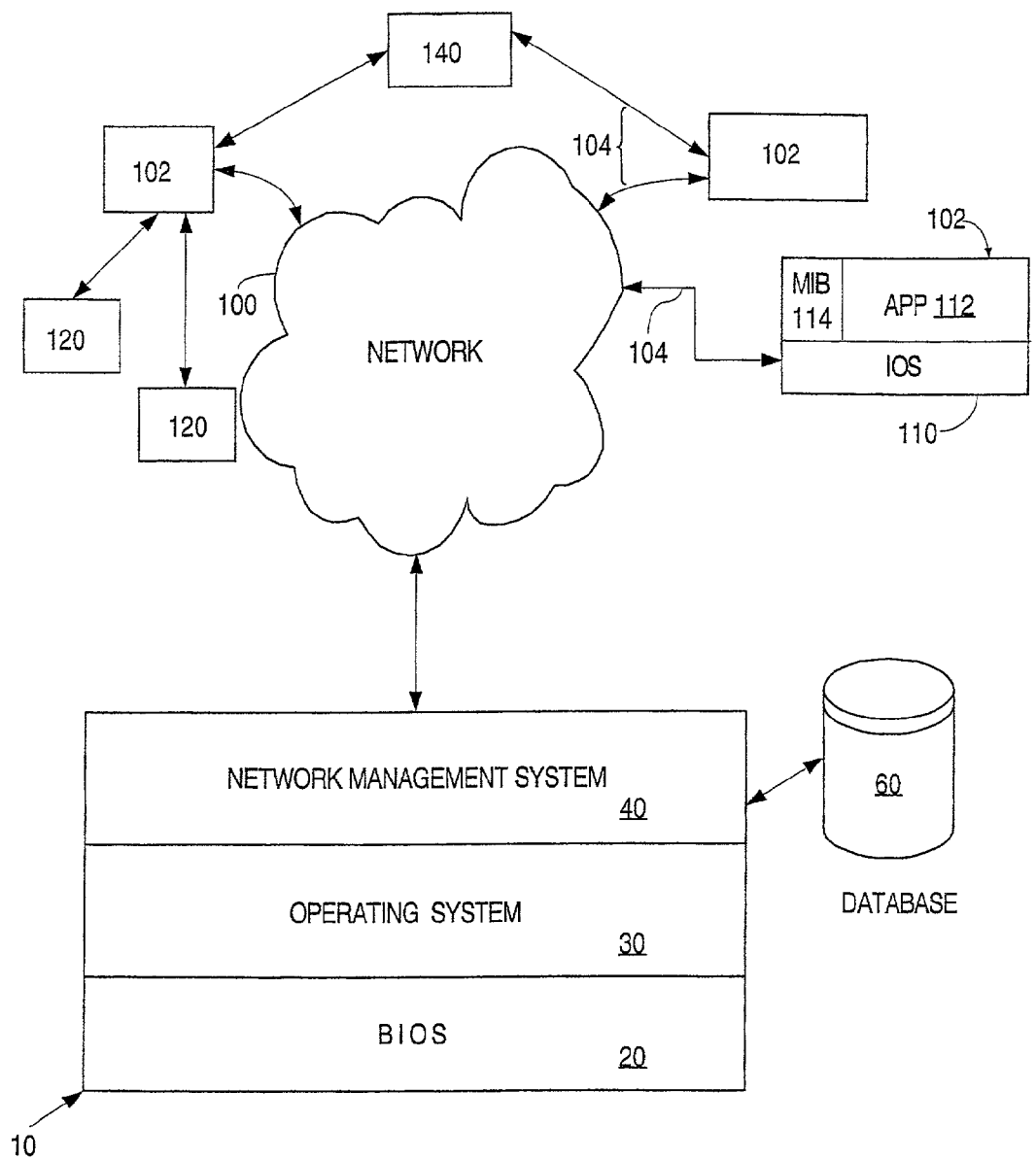
FIG. 1 is a block diagram of a network that is managed by a network management system running on one or more network management applications.

FIG. 1 is a simplified diagram of a network 100 that is managed by a network management system running on one or more network management stations 10. The network 100 comprises one or more network devices 102, such as switches, routers, bridges, gateways and other devices. Each network device 102 is coupled to another network device 102, or to one or more end stations 120. Each end station 120 is a terminal node of the network 100 at which some type of work is carried out. For example, an end station 120 is a workstation, a printer, a server, or similar device.

Each network device 102 executes a network-oriented operating system 110. An example of a network-oriented operating system is the Internetworking Operating System (IOS) commercially available from Cisco Systems, Inc. Each network device 102 also executes one or more applications 112 under control of the operating system 110. The operating system 110 supervises operation of the applications 112 and communicates over network connections 104 using one or more agreed-upon network communication protocols, such as Simple Network Management Protocol (SNMP).

Each device 102 stores information about its current configuration, and other information, in one or more forms of organized data storage, for example, a Management Information Base (MIB) 114. Information in the MIB 114 is organized in one or more MIB variables. The network management station 10 can send "get" and "set" commands to the device 102 in order to retrieve or set values of MIB variables. Examples of MIB variables include sysObjectID and sysDescr. For information stored in other forms, there are other types of communications and commands to set and retrieve the information values.

The network management station 10 may be a general-purpose computer system of the type shown and described further herein in connection with FIG. 3. The network management station 10 executes one or more software components that carry out the functions shown in block diagram form in FIG. 1. For example, the network management station 10 executes a basic input/output system (BIOS) 20 that controls and governs interaction of upper logical layers of the software components with hardware of the network management station. An example of a suitable BIOS is the Phoenix ROM BIOS. The network management station 10 also executes an operating system 30 that supervises and controls operation of upper-level application programs. An example of a suitable operating system is the Microsoft Windows NT® operating system. The network management station 10 may also execute other operating systems that may not require a BIOS 20, such as UNIX-type operating systems, microkernel-based operating systems, etc.

The network management station 10 executes an asynchronous network interface (ANI) 50 under control of the operating system 30. The ANI 50 provides an interface to the network 100 and communicates with the network using SNMP or other agreed-upon protocols. The ANI 50 provides numerous low-level services and functions for use by higher-level applications.

The network management station 10 executes a network management system 40 that interacts with an information base 60 containing information about the managed network 100. The information base may be implemented on one or more of: relational databases, object databases, directories, flat file systems, ISAM file systems, etc. The network management system 40 is an example of a network management application. Using a network management application, a manager can monitor and control network components. For example, a network management application enables a manager to interrogate devices such as host computers, routers, switches and bridges to determine their status and to obtain statistics about the networks to which they attach. The network management application also enables a manager to control such devices by changing device configuration or operation information, for example, routes and configuring network interfaces. An example of a network management application is Resource Manager Essentials, commercially available from Cisco Systems, Inc.

The ANI 50 and network management system 40 need not execute or reside on the same physical computer. They may execute on different machines. There need not be only one ANI 50 or only one network management system 40.

2.0 Structural Overview

Figure 2:
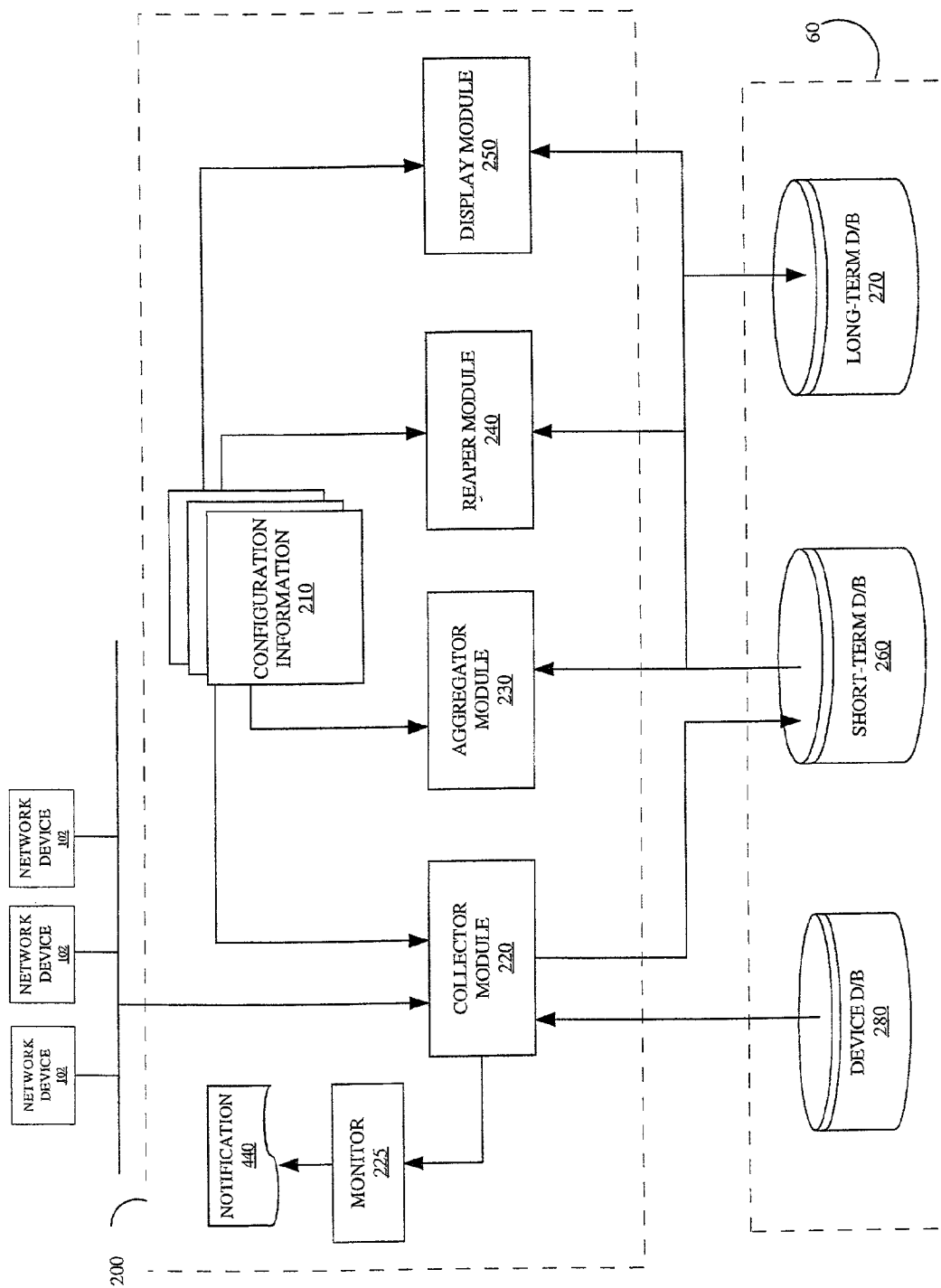
FIG. 2 is a block diagram that illustrates an overview of a network management collector.

FIG. 2 is a block diagram that illustrates an overview of a network management collector 200. The network management collector 200 may be implemented as a part of the network management system 40 (FIG. 1). As can be seen in FIG. 2, the network management collector 200 includes configuration information 210, at least one collector module 220 (each including a monitor module 225), at least one aggregator module 230, at least one reaper module 240 and a display module 250. As a component of the network management system 40, the network management collector 200 interfaces with the network devices 102 and the information base 60. In one aspect of the invention, the information base 60 further includes a short-term database 260, a long-term database 270 and a device inventory database 280.

In one aspect of the invention, configuration information 210 is an XML (Extensible Markup Language) file that contains data on how to configure and operate the collector module 220, the aggregator module 230, the reaper module 240 and the display module 250. The function of configuration information 210 is described in more detail below with respect to FIG. 3.

The collector module 220 is responsible for gathering data from network devices 102 for a particular network management purpose. For example, the data may include, but is not limited to, information relating to status or performance of each network device 102. The collector module 220 can perform periodic queries on the data, transform the data according to preset formulas and store resultant data to the short-term database 260. The collector module 220 can also monitor the data for compliance with prescribed threshold conditions. All data acquisition scheduling, queries, transforms, storage instructions and monitoring thresholds are specified in the configuration information 210. The function of the collector module 220 is described in more detail below with respect to FIG. 4.

The aggregator module 230 is responsible for periodically selecting and transforming data from one of the collector modules 220 and creating trending information. The aggregator module 230 stores resultant trending information to the long-term database 270. Data transforms, trending formula and storage instructions are specified in configuration information 210. The function of the aggregator module 230 is described in more detail below with respect to FIG. 5.

The reaper module 240 is responsible for removing data from the short-term database 260 and the long-term database 270 when it is no longer desired. Data is removed based on parameters specified in configuration information 210. The function of the reaper module 240 is described in more detail below with respect to FIG. 6.

The display module 250 is responsible for rendering a user visible data display of information stored in the short-term database 260 and the long-term database 270. The information to be displayed and the format of the display are based on parameters specified in configuration information 210. The function of the display module 250 is described in more detail below with respect to FIG. 7.

3.0 Functional Overview

FIG. 3A depicts a block diagram that illustrates the structure of configuration information 210 when the configuration information is structured as an XML file. XML files provide a flexible way to create common information formats and share both the format and data on various networks, such as the World Wide Web and intranets, and can be processed purely as data by a program, stored with similar data on another computer or displayed. Using an XML file as configuration information 210 allows a user to determine what, where, when and how data is to be collected in a fast and flexible manner without the need to upgrade the network management software.

As shown in FIG. 3A, configuration information 210 is divided into various sections that prescribe the configuration and operation of one or more modules of the network management collector 200. In one aspect of the invention, the sections include, but are not limited to, a name section 310, a scheduler section 320, a target section 330, an operation section 340, a storage section 350, a threshold section 360, an aggregation section 370, a table trimmer section 380 and a presentation section 390. Each configuration information 210 thus forms a unique data acquisition set, configured for performing specific measurements, operations and tasks on specific network devices.

Information stored in name section 310 of configuration information 210 assigns a distinctive name to the file, thereby identifying it as a unique data acquisition set. The collector module 220 can thereby distinguish the various files, or data acquisition sets, by name to assure that the desired data is acquired at the desired time from the desired device or devices.

The scheduler section 320 of configuration information 210 contains instructions on when and how often the collector module 220 is to acquire data. Polling of network devices 102 can thus be scheduled at prescribed time intervals, at specific dates and times, or at specific recurring frequencies.

The target section 330 of configuration information 210 contains two basic types of information. First, it contains information as to the identity of the specific network devices 102 that the collector module 220 will poll. Thus, a user can pick and choose which network devices 102 to poll and which to exclude from polling. Second, target section 330 contains device-specific information related to data type and protocol for each network device 102. This information includes what data types are available for collection from each device (such as CPU usage, device cache hits, dropped packets, etc.), which network communication protocol is required to collect the data type (such as SNMP, Telnet, etc.), and device-specific graphical user interface (GUI) attributes.

The operation section 340 of configuration information 210 contains one or more arithmetic formulas that define specific transformations to be performed on the acquired data. Storage section 350 contains instructions relating to storage of values resulting from the transformations, such as specifying the row and column of the database where the data should be stored.

The threshold section 360 of configuration information 210 contains threshold criteria values. Such criteria may include, but is not limited to, specified minimums, maximums, averages, etc. Additionally, threshold section 360 contains information defining if and when to generate a notification 440 upon the occurrence of a threshold condition, discussed below with respect to FIG. 4.

The aggregation section 370 of configuration information 210 contains various parameters relating to aggregating the acquired data, such as how often stored data should be aggregated, which data to select, specific formulas for transforming the data into trending information and how to store the resultant information to the long-term database 270.

The table trimmer section 380 of configuration information 210 contains instructions for removing or trimming data from either the short-term database 260 or the long-term database 270.

The presentation section 390 of configuration information 210 contains an application program interface (API) that provides presentation logic to the system. The presentation logic performs various tasks, such as identifying the rows and columns of data that was collected, determining where the data is located, obtaining the GUI attributes of the network device 102 from which the data was taken, specifying which rendering algorithm to use, etc. The API thus uses the presentation logic to render a GUI so that data can be displayed to a user.

In one aspect of the invention, an XML document type definition (DTD) file is used to set up the configuration information 210. The XML DTD is the specification that identifies the markups in the configuration information 210 for various functions, such as separating paragraphs, identifying topic headings, etc., and determining how each is to be processed. FIG. 3B is a table showing a listing of an exemplary XML DTD file. FIG. 3C is a table showing a listing of configuration information 210 as an exemplary XML configuration file using the XML DTD file of FIG. 3B.

As shown in FIG. 3C, a name segment 311 of configuration information 210 contains information on the identity of the unique data acquisition set corresponding to name section 310. In this example, the name of the XML configuration file is "Router Host Information". A scheduler segment 321 contains the schedule for the polling frequency corresponding to scheduler section 320 of configuration information 210. In this example, the scheduler segment contains instructions to poll the network devices every 60 seconds. A segment 331 contains the identity of the particular network devices to be polled corresponding to target section 330 of configuration information 210. In this example, the target devices are routers. A segment 332 performs acquisition of specific data on the target devices. A segment 341 contains instructions on formulas and transformations that are to be performed on the data corresponding to operation section 340 of configuration information 210. A segment 351 contains instructions on outputting and storing the acquired or transformed data corresponding to storage section 350 of configuration information 210. A segment 361 sets threshold limits and segment 362 contains information on generating a notification corresponding to threshold section 360 of configuration information 210.

Figure 4:
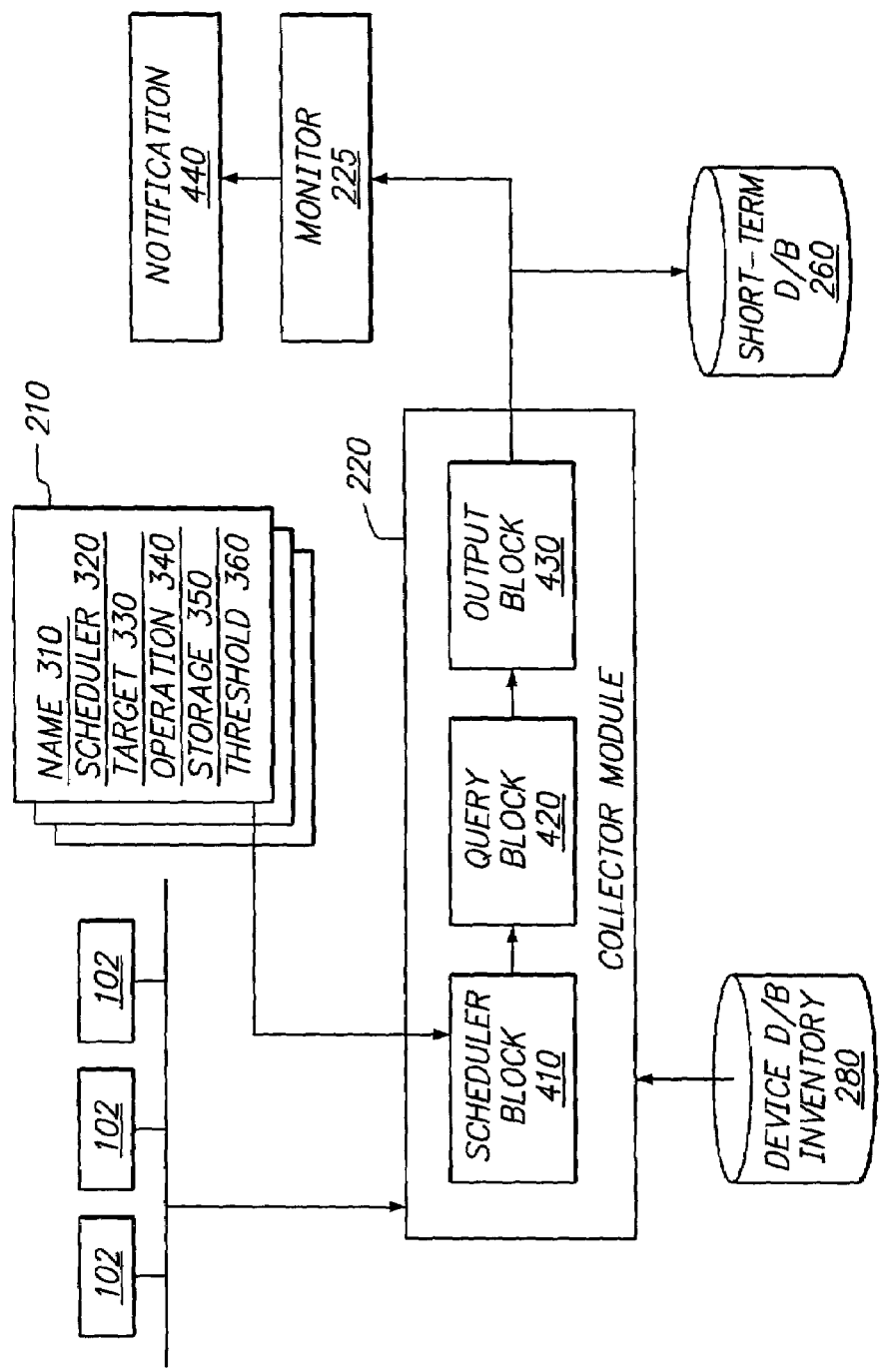
FIG. 4 is a block diagram that illustrates an overview of a collector module.

FIG. 4 is a block diagram that illustrates an overview of the operation of the collector module 220 of the network management collector 200. The collector module 220 retrieves an inventory of available network devices 102 from the device inventory database 280. Because the collector module 220 is running as a part of the network management system 40 of network management station 10 (FIG. 1) as a node on the network, it can communicate with each available network device 102. Before acquiring data from the available network devices 102, however, the collector module 220 must parse the pertinent sections of configuration information 210 for configuration and operational instructions.

The collector module 220 parses information from scheduler section 320 of configuration information 210, then executes the instructions by way of a scheduler block 410. The function of scheduler block 410 is to tell the collector module 220 when to poll the network devices 102 for specific data. As discussed above, polling can be scheduled at prescribed time intervals, at specific dates and times, or at specific recurring frequencies. For example, the scheduler block 410 can instruct the collector module 220 to poll devices every six minutes, on the fourth Thursday of each month, etc.

The collector module 220 further includes a query block 420. The query block 420 causes the collector module 220 to poll and query specific targeted network devices 102 specified by the information parsed from target section 330. Each network device 102 is queried using the protocol-specific variables for that device at the times specified by scheduler block 410. For example, target section 330 can instruct query block 420 to query only routers on the network and specify the appropriate SNMP variable "ipVariable".

After each network device 102 is polled and queried, the data thus acquired is sent to an output block 430 of the collector module 220. The output block 430 serves two purposes. First, it executes one or more simple or complex arithmetic operations on the acquired data, producing a data transformation. The specific transformation is defined by one or more formulas that are parsed from operation section 340 of configuration information 210. The formulas can be applied to any or all data acquired by the query block 420. Second, output block 430 will store the acquired data, the transformed data or both to the short-term database 260. Instructions for data storage originates from information parsed from storage section 350 of configuration information 210.

The monitor module 225 of the collector module 220 verifies whether the acquired data, the transformed data or both meet specific threshold criteria. The threshold criteria are defined by information parsed from threshold section 360 of configuration information 210. As discussed above, such criteria may include specified minimums, maximums, averages, etc. Additionally, threshold section 360 contains information defining if and when to generate notification 440 upon the occurrence of a threshold condition. For example, a user can generate notification 440 when data falls outside of desired boundaries. The notification 440 can be stored in the short-term database 260 or the long-term database 270.

Figure 5:
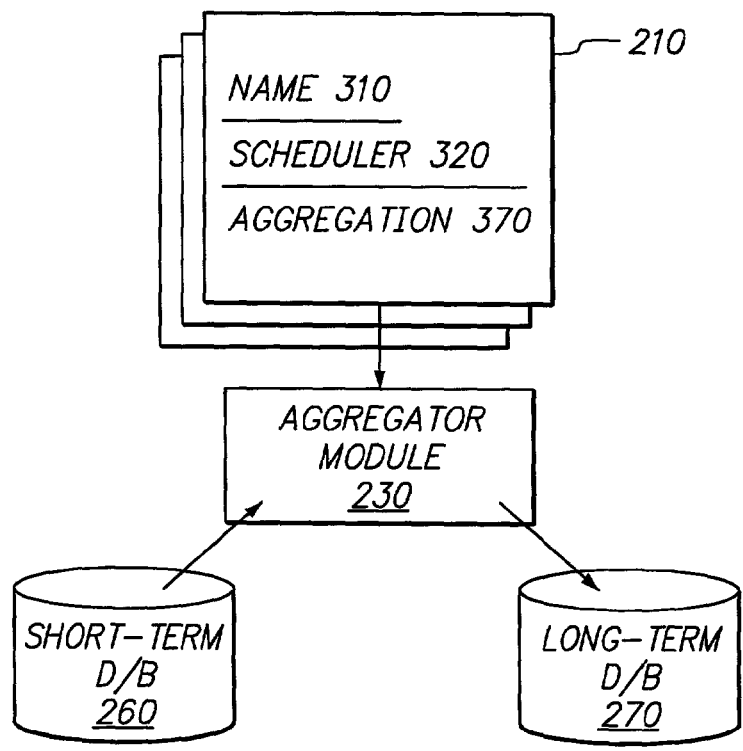
FIG. 5 is a block diagram that illustrates an overview of an aggregator module.

FIG. 5 is a block diagram that illustrates an overview of the aggregator module 230 of the network management collector 200. The function of the aggregator module 230 is to aggregate stored data into information that shows data trends over time. This trending information can give a user a long-term view of the stored data and reveal any patterns that may exist.

To provide the desired aggregation of stored data, the aggregator module 230 parses instructions from scheduler section 320 and aggregation section 370 of configuration information 210. As discussed above, scheduler section 320 and aggregation section 370 contain various parameters on aggregating the acquired data, such as how often stored data should be aggregated, which data to select, specific formulas for transforming the data into trending information and how to store the resultant information to the long-term database 270. In accordance with the parsed instructions, the aggregator module 230 periodically reads data from the short-term database 260 stored by the collector module 220 (FIG.

4) as described above, transforms the stored data into trending information, and stores the resultant trending information to the long-term database 270. For example, the collector module 220 can store data averages every six minutes into short-term database 260, and the aggregator module 230 can save the total data average at the end of the day into long-term database 270.

Figure 6:
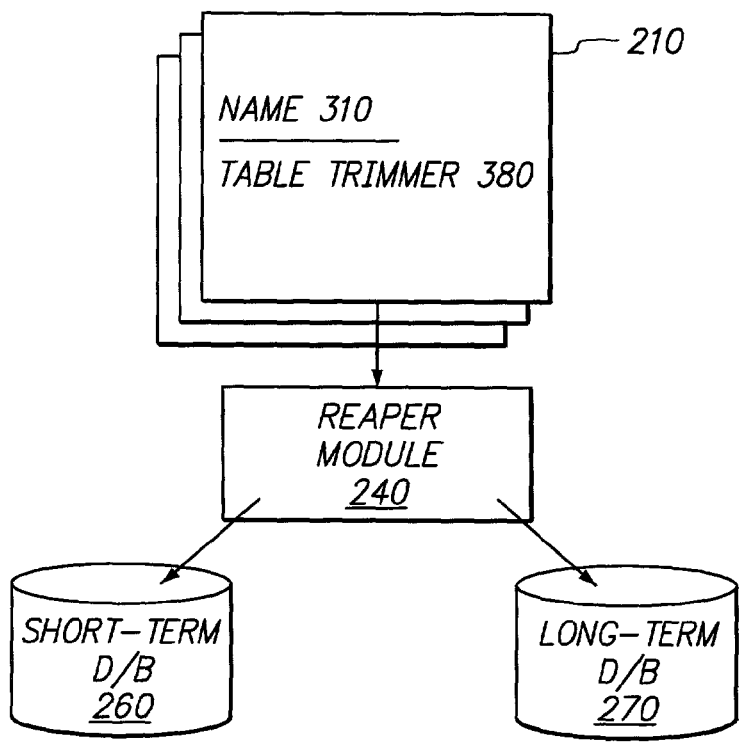
FIG. 6 is a block diagram that illustrates an overview of a reaper module.

FIG. 6 is a block diagram that illustrates an overview of the reaper module 240. The purpose of the reaper module 240 is to remove or trim data stored on the short-term database 260 and the long-term database 270 once such data is no longer needed. As discussed above, the instructions and the criteria for trimming data from either database is parsed from information contained in table trimmer section 380 of configuration information 210. For example, table trimmer section 380 may instruct reaper module 240 to delete any data older than 30 days from short-term database 260, and data more than 90 days old from long-term database 270.

Figure 7:
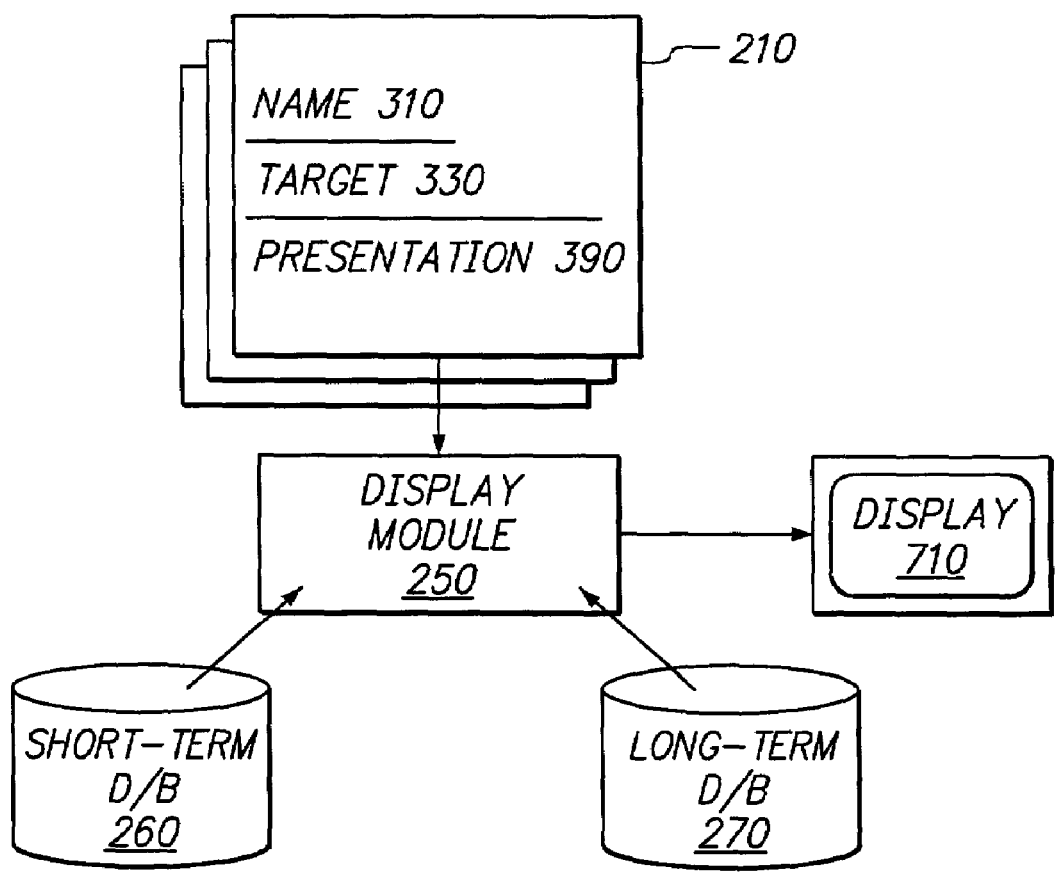
FIG. 7 is a block diagram that illustrates an overview of the display module.

FIG. 7 is a block diagram that illustrates an overview of the display module 250. The display module 250 causes information to be presented to a user by way of a display device 710. An example of display device 710 is display 812, shown below in reference to FIG. 8. The display module 250 parses information contained in target section 330 and presentation section 390 of configuration information 210. As discussed above in reference to FIG. 3, presentation section 390 contains an application program interface (API) that provides presentation logic to the system. The presentation logic performs various tasks, such as identifying the rows and columns of data that was collected, determining where the data is located, obtaining the GUI attributes of the network device 102 from which the data was taken, specifying which rendering algorithm to use, etc. The API thus uses the presentation logic to render a GUI so that data can be displayed to a user.

Figure 8A:
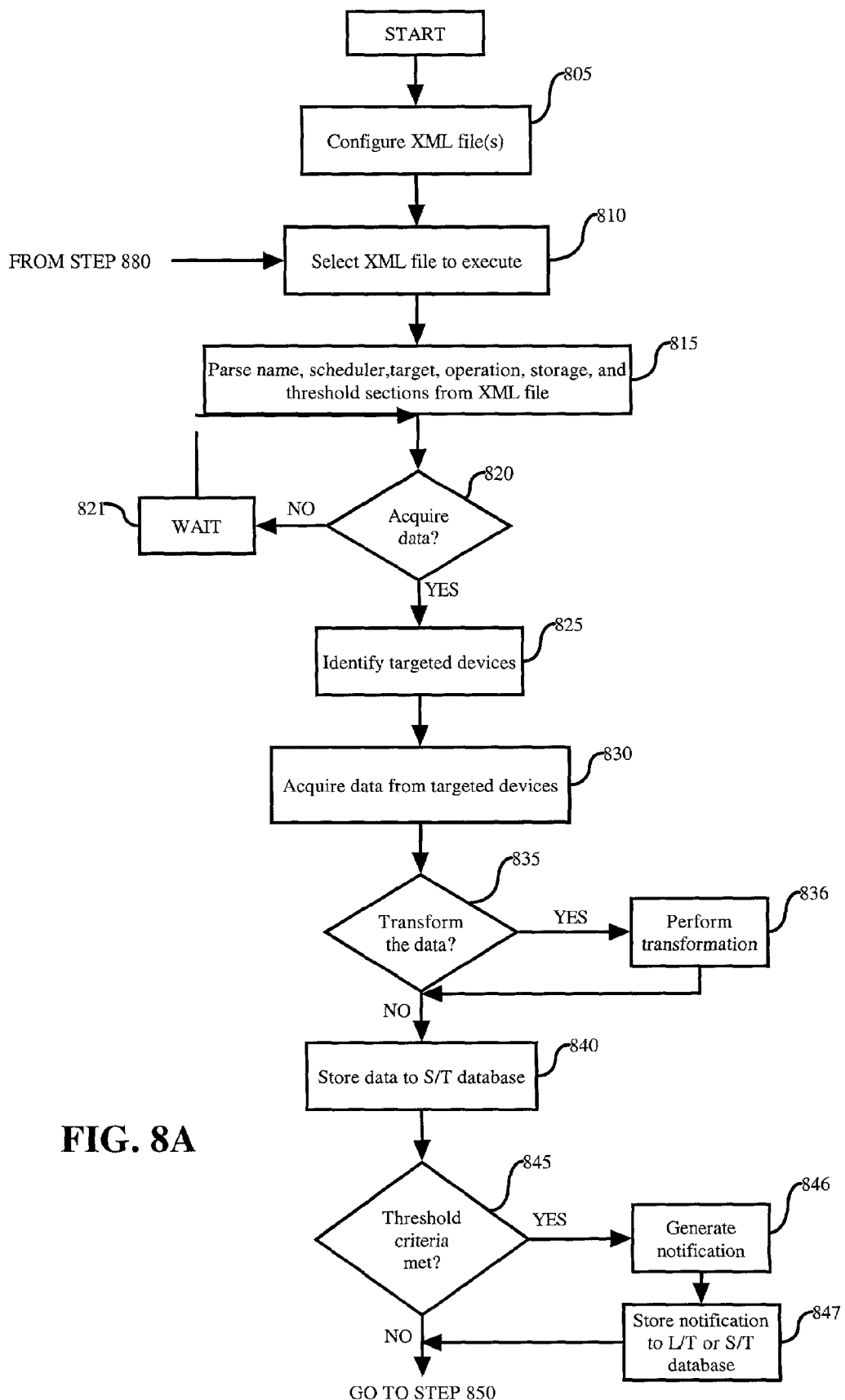
FIGS. 8A and 8B are flow diagrams describing a method for collecting, aggregating and monitoring network management information.
Figure 8B:
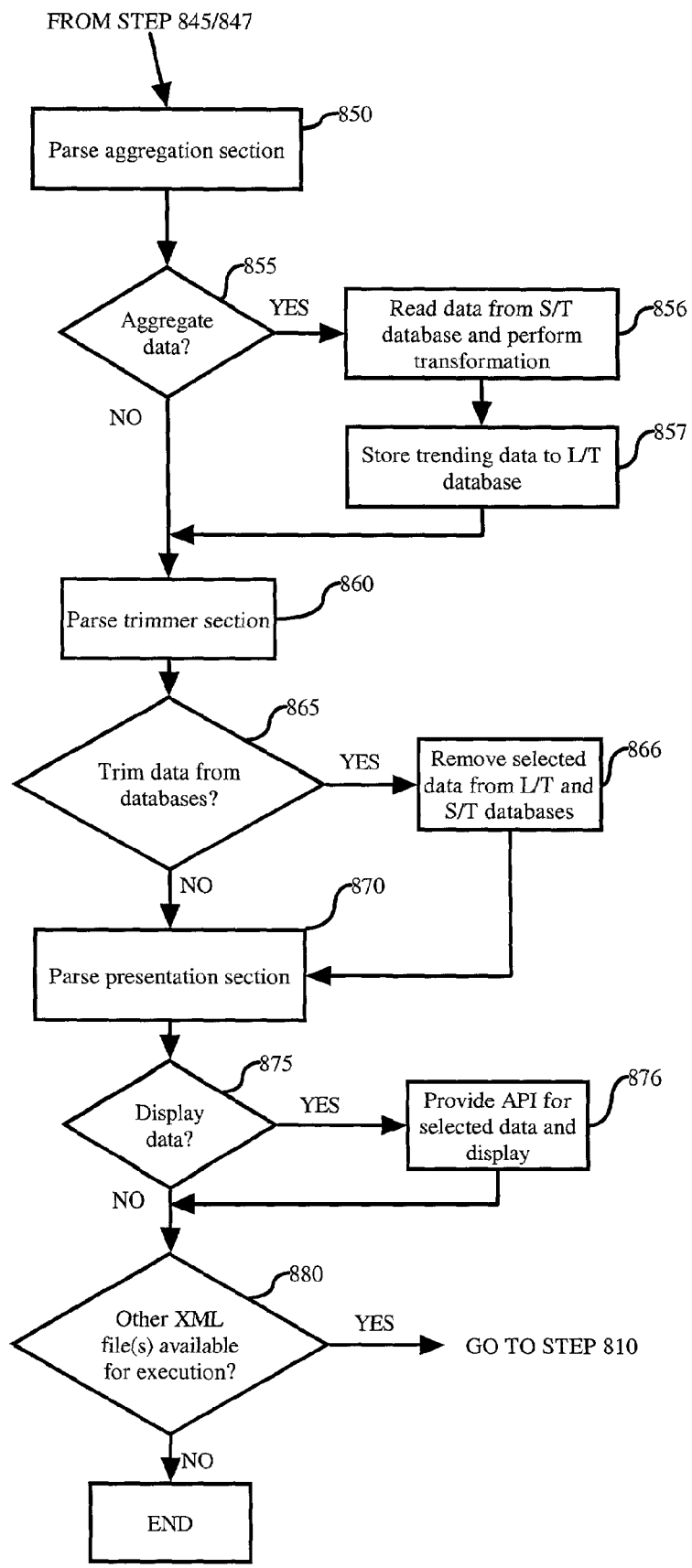

FIGS. 8A and 8B are flow diagrams describing a method for collecting, aggregating and monitoring network management information. The process starts with step 805 of FIG. 8A, where configuration information 210 is configured. The configuration information 210 is preferably an XML file. After all XML configuration files are configured, in step 810 a specific XML configuration file is selected for execution. The name, scheduler, target, operation, storage and threshold sections of the XML configuration file are parsed by the collector module 220 in step 815, in the manner described above in reference to FIG. 4.

In step 820, the process inquires if a scheduled acquisition of data is due. The scheduling of an acquisition is parsed from scheduler section 320. If no acquisition is due, then at step 821 the process waits a predetermined period of time and inquires again at step 820. If an acquisition is due, then in step 825 the process identifies specific target network devices 102 for data acquisition from information parsed from target section 330. In step 830, the process causes data to be acquired from target network devices 120.

In step 835, the process inquires whether the just acquired data should be transformed according to instructions parsed from the operation section 340. If transformation is required, then in step 836 the process causes the data to be transformed accordingly. Then, in step 840, the resultant data is stored in the short-term database 260 according to instructions parsed from storage section 350. If no transformation is required, the process bypasses step 836 and in step 840 simply stores the just acquired data in the short-term database 260.

In step 845, the process inquires whether the acquired data and/or transformed data meet specific threshold criteria based on information parsed from threshold section 360. If the threshold criteria are met, then in step 846 the process generates a notification 440 (FIG. 4). In step 847, the notification 440 is stored in the short-term database 260 or the long-term database 270 according to instructions from storage section 350. The process continues at step 850, described below. If the threshold criteria are not met, then the process bypasses steps 846 and 847 and proceeds to step 850.

As shown in FIG. 8B, step 850 parses instructions from aggregation section 370 as described above in reference to FIG. 5. In step 855, the process uses this information to inquire whether the just acquired data should be aggregated. If so, then in step 856 the process causes data to be read from the short-term database 260 and aggregates the data into trending information according to the instructions parsed from aggregation section 370. In step 857, the resultant trending data is then stored in the long-term database 270. If the data is not to be aggregated, then the process bypasses steps 856 and 857 and continues in step 860.

In step 860, the process parses instructions from table trimmer section 380 as described above in reference to FIG. 6. In step 865, the process uses this information to inquire whether any of the data currently stored in either the short-term or the long-term database should be removed. If data is identified for removal, then in step 866 the process causes the data to be deleted from either the short-term database 260, the long-term database 270, or both, according to the instructions parsed from table trimmer section 380. If no data is identified for removal, then the process bypasses step 866 and continues at step 870.

In step 870, the process parses instructions from presentation section 390 as described above in reference to FIG. 7. In step 875, the process uses this information to inquire whether any of the data currently stored in either the short-term or the long-term database should be rendered and displayed to a user. If data is to be displayed, then in step 876 the process provides the appropriate API for the selected data and causes it to be displayed according to the instructions parsed from presentation section 390. If no data is to be displayed, then the process bypasses step 876 and continues in step 880.

At step 880, the XML configuration file has been fully executed and the process inquires whether any other XML configuration files are available for execution. If so, the process returns to step 810 and begins again. If not, the process ends.

4.0 Implementation Mechanisms—Hardware Overview

Figure 9:
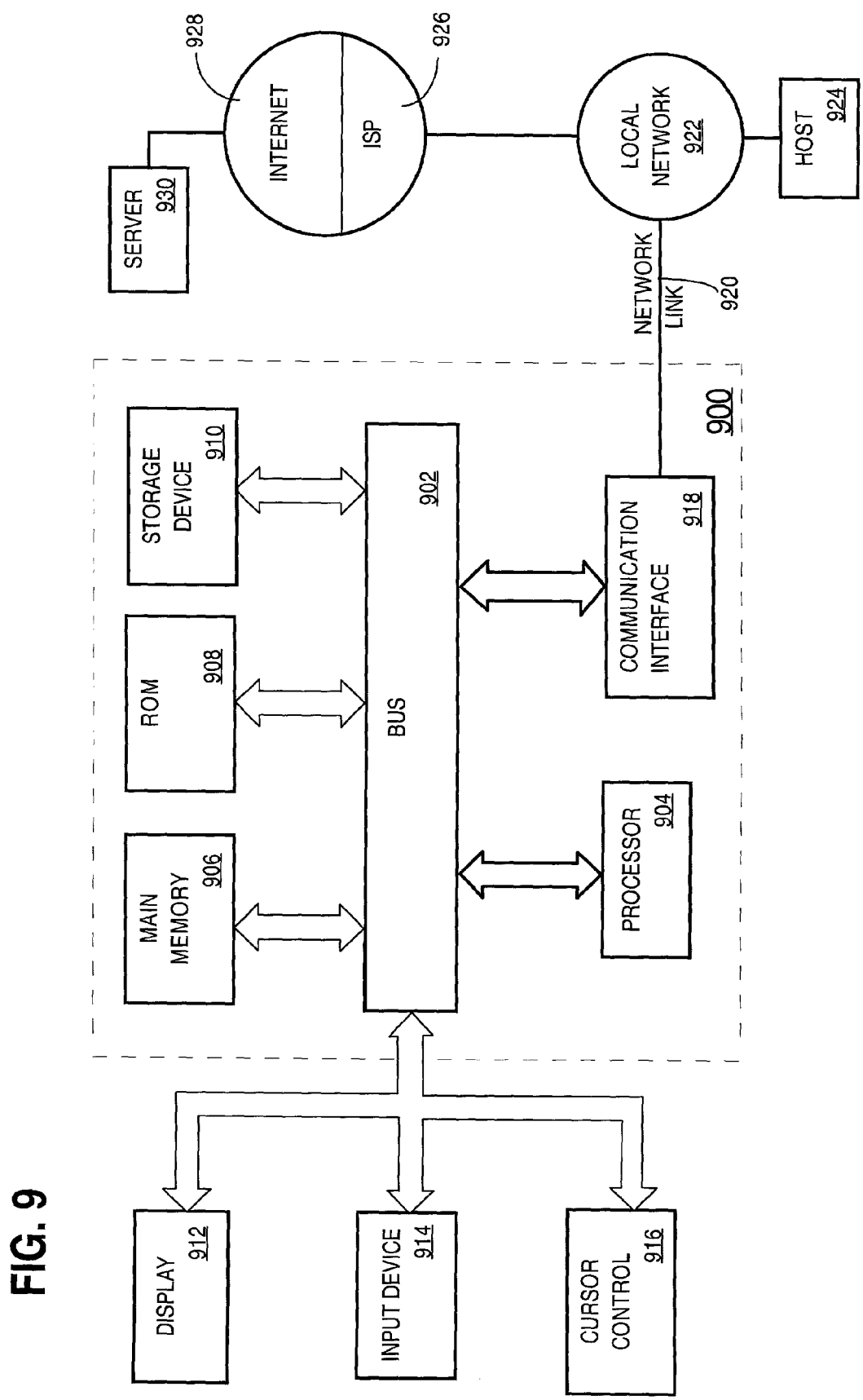
FIG. 9 is a block diagram that illustrates a computer system upon which an aspect of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 909 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for collecting, aggregating and monitoring network management information. According to one embodiment of the invention, collecting, aggregating and monitoring network management information is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 919 coupled to bus 902. Communication interface 919 provides a two-way data communication coupling to a network link 920 that is connected to a local network 922. For example, communication interface 919 may be an integrated services digital network ("ISDN") card or a modem to provide a data communication connection to a corresponding type of telephone line. As another example, communication interface 919 may be a local area network ("LAN") card to provide a data communication connection to a compatible LAN. Wireless links may also be implemented. In any such implementation, communication interface 919 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 929. Local network 922 and Internet 929 both use electrical, electromagnetic or optical signals that carry digital data streams. The signals through the various networks and the signals on network link 920 and through communication interface 919, which carry the digital data to and from computer system 900, are exemplary forms of carrier waves transporting the information.

Computer system 900 can send messages and receive data, including program code, through the network(s), network link 920 and communication interface 919. In the Internet example, a server 930 might transmit a requested code for an application program through Internet 929, ISP 926, local network 922 and communication interface 919. In accordance with the invention, one such downloaded application provides for collecting, aggregating and monitoring network management information as described herein.

The received code may be executed by processor 904 as it is received, and/or stored in storage device 910, or other non-volatile storage for later execution. In this manner, computer system 900 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of collecting network management information from a plurality of network devices in a network management system, the method comprising the computer-implemented steps of:

configuring said network management system to acquire data from specific network devices from said plurality of network devices based on a user-definable operational specification;

querying said specific network devices for data to form a set of acquired data based on said operational specification;

transforming said acquired data to form a set of transformed data based on one or more formulas specified in said operational specification; and storing said transformed data to an information base to form a set of stored data based on said operational specification.

2. A method as recited in claim 1, wherein said operational specification is defined in an Extensible Markup Language file.

3. A method as recited in claim 1, wherein said operational specification includes a scheduling block to direct said network management system to perform said querying step at a preset point in time.

4. A method as recited in claim 1, wherein the step of querying said specific network devices includes using a network communication protocol that is defined in said operational specification for each of said specific network devices.

5. A method as recited in claim 1, wherein the step of transforming said acquired data includes performing at least one arithmetic transformation on said acquired data, wherein said arithmetic transformation is specified by said operational specification.

6. A method as recited in claim 1, further comprising the step of monitoring said acquired data, said transformed data and said stored data for compliance with at least one threshold criterion value specified by said operational specification.

7. A method as recited in claim 6, further comprising the step of generating a notification when any of said acquired data, said transformed data and said stored data complies with said threshold criterion.

8. A method as recited in claim 1, further comprising the step of aggregating said stored data to form a set of trending data by performing at least one arithmetic aggregation on said stored data, wherein said arithmetic aggregation is specified by said operational specification.

9. A method as recited in claim 1, further comprising the step of removing a quantity of said stored data from said information base in accordance with information in said operational specification.

10. A method of collecting and aggregating network management information from a plurality of network devices in a network management system, the method comprising the computer-implemented steps of:

configuring said network management system to acquire data from specific network devices from said plurality of network devices based on a user-definable operational specification;

querying said network devices for data to form a set of acquired data based on said operational specification;

transforming said acquired data to form a set of transformed data based on said operational specification;

storing said transformed data to an information base to form a set of stored data based on said operational specification; and aggregating said stored data to form a set of trending data by performing at least one arithmetic aggregation on said stored data, wherein said arithmetic aggregation is specified by said operational specification.

11. A method as recited in claim 10, wherein said operational specification is defined in an Extensible Markup Language file.

12. A method as recited in claim 10, wherein said operational specification includes a scheduling block to direct said network management system to perform said querying step at a preset point in time.

13. A method as recited in claim 10, wherein the step of querying said specific network devices includes using a network communication protocol that is defined in said operational specification for each of said specific network devices.

14. A method as recited in claim 10, wherein the step of transforming said acquired data includes performing at least one arithmetic transformation on said acquired data, wherein said arithmetic transformation is specified by said operational specification.

15. A method as recited in claim 10, further comprising the step of monitoring said acquired data, said transformed data and said stored data for compliance with at least one threshold criterion value specified by said operational specification.

16. A method as recited in claim 15, further comprising the step of generating a notification when any of said acquired data, said transformed data and said stored data complies with said threshold criterion.

17. A method as recited in claim 10, further comprising the step of removing a quantity of said stored data from said information base in accordance with information in said operational specification.

18. A method of collecting, aggregating and monitoring network management information from a plurality of network devices in a network management system, the method comprising the computer-implemented steps of:

configuring said network management system to acquire data from specific network devices from said plurality of network devices based on a user-definable operational specification, wherein said operational specification is an Extensible Markup Language file and includes a scheduling block to direct said network management system to operate at a preset point in time;

querying said specific network devices for data to form a set of acquired data based on said operational specification, using a network communication protocol that is defined in said operational specification for each of said specific network devices;

transforming said acquired data to form a set of transformed data, including
performing at least one arithmetic transformation on said acquired data,
wherein said arithmetic transformation is specified by said operational specification;

storing said transformed data to an information base to form a set of stored data based on said operational specification;

monitoring said acquired data, said transformed data and said stored data for compliance with at least one threshold criterion value specified by said operational specification;

generating a notification when any of said acquired data, said transformed data and said stored data complies with said threshold criterion value;

aggregating said stored data to form a set of trending data by performing at least one arithmetic aggregation on said stored data, wherein said arithmetic aggregation is specified by said operational specification; and removing a quantity of said stored data from said information base based on information in said operational specification.

19. A computer-readable medium carrying one or more sequences of instructions for collecting network management information from a plurality of network devices in a network management system, which instructions, when executed by one or more processors, cause the one or more processors to carry out the steps of:
- configuring said network management system to acquire data from specific network devices from a plurality of network devices on a network based on a user-definable operational specification;
- querying said network devices for data to form a set of acquired data based on said operational specification;
- transforming said acquired data to form a set of transformed data based on formulas specified in said operational specification; and
- storing said transformed data to an information base to form a set of stored data based on said operational specification.

20. An apparatus for collecting network management information from a plurality of network devices in a network management system, comprising:
- means for configuring said network management system to acquire data from specific network devices from said plurality of network devices based on a user-definable operational specification;
- means for querying said network devices for data to form a set of acquired data based on said operational specification;
- means for transforming said acquired data to form a set of transformed data based on formulas specified in said operational specification; and
- means for storing said transformed data to an information base to form a set of stored data based on said operational specification.

21. An apparatus for collecting and aggregating network management information in a network management system, comprising:
- one or more configuration files for configuring said network management system to acquire data from a specific plurality of network devices on a network based on a user-definable operational specification;
- one or more query modules for querying said network devices for data to form a set of acquired data based on said operational specification;
- one or more transformation modules for transforming said acquired data to form a set of transformed data based on said operational specification;
- one or more storage modules for storing said transformed data to an information base to form a set of stored data based on said operational specification; and
- one or more aggregation modules for aggregating said stored data to form a set of trending data by performing at least one arithmetic operation on said stored data, said arithmetic operation specified by said operational specification.

* * * * *